(12) United States Patent
Cooper et al.

(10) Patent No.: US 7,982,743 B2
(45) Date of Patent: Jul. 19, 2011

(54) METHOD AND APPARATUS FOR READING FILM GRAIN PATTERNS IN A RASTER ORDER IN FILM GRAIN SIMULATION

(75) Inventors: Jeffrey Allen Cooper, Rocky Hill, NJ (US); Joan Llach, Mercer, NJ (US); Cristina Gomila, Mercer, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 514 days.

(21) Appl. No.: 11/251,696

(22) Filed: Oct. 17, 2005

(65) Prior Publication Data

US 2006/0083426 A1   Apr. 20, 2006

Related U.S. Application Data

(60) Provisional application No. 60/619,632, filed on Oct. 18, 2004.

(51) Int. Cl.
*G09G 5/00* (2006.01)

(52) U.S. Cl. ...................................................... 345/581
(58) Field of Classification Search .................... 345/581
See application file for complete search history.

(56) References Cited

U.S. PATENT DOCUMENTS

| | | | | |
|---|---|---|---|---|
| 4,791,594 | A * | 12/1988 | Harney et al. .................. | 708/254 |
| 5,475,425 | A * | 12/1995 | Przyborski et al. ............ | 348/239 |
| 5,641,596 | A * | 6/1997 | Gray et al. ....................... | 430/21 |
| 5,659,382 | A | 8/1997 | Rybczynski | |
| 5,831,673 | A * | 11/1998 | Przyborski et al. ............ | 348/239 |
| 2002/0034337 | A1 * | 3/2002 | Shekter ........................... | 382/275 |
| 2003/0142102 | A1 * | 7/2003 | Emberling et al. ............ | 345/540 |

FOREIGN PATENT DOCUMENTS

| | | |
|---|---|---|
| EP | 1662802 | 5/2006 |
| JP | 9-508507 | 8/1997 |
| JP | 2005-80301 | 3/2005 |
| WO | WO 95/20292 | 7/1995 |
| WO | WO 97/22204 A1 | 6/1997 |
| WO | WO 02/33958 A2 | 4/2002 |

OTHER PUBLICATIONS

Cristina Gomila, "SEI Message for Film Grain Encoding: Syntax and Results", Joint Video Team (JVT of ISO/IEC MPEG & ITU-T VCEG (ISO/IEC JTC1/SC29/WG11 and ITU-T SG16 Q.6), 7th Meeting: San Diego, California, USA, Sep. 2-5, 2003.

Campisi, P. et al., "Signal-Dependent Film Grain Noise Generation Using Homomorphic Adaptive Filtering", IEE Proceedings: Vision, Image and Signal Processing, Institution of Electrical Engineers, GB, vol. 147, No. 3, Jun. 23, 2000, pp. 283-287.

Schlockermann, M. et al., "Film Grain Coding in H.264/AVC", Joint Video Team (JVT) of ISO/IEC MPEG 8 ITU-T VCEG (ISO/IEC JTC1/SC29/WG11 and ITU-T SG16 Q6), Sep. 2, 2006, pp. 1-8.

* cited by examiner

*Primary Examiner* — Xiao Wu
*Assistant Examiner* — Edward Martello
(74) *Attorney, Agent, or Firm* — Robert D. Shedd; Robert B. Levy; Jorge Tony Villabon

(57) ABSTRACT

The present invention provides a method and apparatus for reading film grain patterns in a raster order in film grain simulation including establishing a pseudo-random starting position, repeating the pseudo-random starting position for each line of a group of film grain blocks, and using a different pseudo-random starting position for each display line of a next group of film grain blocks. In various embodiments of the present invention, the different pseudo-random starting positions are triggered by resetting at least one seed value of a pseudo-random number generator implemented to determine said pseudo-random starting positions.

24 Claims, 3 Drawing Sheets

METHOD AND APPARATUS FOR READING FILM GRAIN PATTERNS IN A RASTER ORDER IN FILM GRAIN SIMULATION

CROSS-REFERENCE TO RELATED APPLICATIONS

This application claims priority to U.S. Provisional Patent Application Ser. No. 60/619,632, filed Oct. 18, 2004, which is herein incorporated by reference in its entirety.

FIELD OF THE INVENTION

The present invention generally relates to film grain simulation and, more particularly, to a method and apparatus for reading film grain patterns in a raster order in film grain simulation.

BACKGROUND OF THE INVENTION

Film grain forms in motion picture images during the process of development. Film grain is clearly noticeable in HD images and becomes a distinctive cinema trait that is becoming more desirable to preserve through the whole image processing and delivery chain. Nevertheless, film grain preservation is a challenge for current encoders since compression gains related to temporal prediction cannot be exploited. Because of the random nature of the grain, visually lossless encoding is only achieved at very high bit-rates. Lossy encoders tend to suppress the film grain when filtering the high frequencies typically associated with noise and fine textures.

In the recently created H.264 I MPEG-4 AVC video compression standard, and in particular in its Fidelity Range Extensions (FRExt) Amendment 1 (JVT-K051, ITU-T Recommendation H.264 I ISO/IEC 14496-10 International Standard with Amendment 1, Redmond, USA, June 2004), a film grain Supplemental Enhancement Information (SEI) message has been defined. Such a message describes the film grain characteristics regarding attributes like size and intensity, and allows a video decoder to simulate the film grain look onto a decoded picture. The H.264 I MPEG-4 AVC standard specifies which parameters are present in the film grain SEI message, how to interpret them and the syntax to be used to encode the SEI message in binary format. The standard does not specify, however, the exact procedure to simulate film grain upon reception of the film grain SEI message.

Film grain simulation is a relatively new technology used in post-production to simulate film grain on computer-generated material, as well as during restoration of old film stocks. For this kind of applications, there exists commercial software in the market like Cineon®, from Eastman Kodak Co, Rochester, N.Y., and Grain Surgery™, from Visual Infinity. These tools require user interaction and are complex to implement, which makes them unsuitable for real-time video coding applications. Furthermore, none of these tools has the capability to interpret a film grain SEI message as specified by the H.264/AVC video coding standard or the like.

SUMMARY OF THE INVENTION

The present invention advantageously provides a method and apparatus for reading film grain patterns in a raster order in film grain simulation.

In one embodiment of the present invention a method for reading film grain patterns in a raster order in film grain simulation includes establishing a pseudo-random starting position, repeating the pseudo-random starting position for each line of a group of film grain blocks, and using a different pseudo-random starting position for each display line of a next group of film grain blocks. In various embodiments of the present invention, the different pseudo-random starting positions are triggered by resetting at least one seed value of a pseudo-random number generator implemented to determine said pseudo-random starting positions.

In an alternate embodiment of the present invention an apparatus for reading film grain patterns in a raster order in film grain simulation includes a pseudo random number generator, for establishing a pseudo-random starting position for each line of a group of film grain blocks and for establishing a different pseudo-random starting position for each display line of a next group of film grain blocks. In one embodiment of the present invention the pseudo-random starting positions each comprise a horizontal offset and a vertical offset and the offsets are determined by taking the most significant bit (MSB) and the least significant bit (LSB) of the pseudo-random number generator.

BRIEF DESCRIPTION OF THE DRAWINGS

The teachings of the present invention can be readily understood by considering the following detailed description in conjunction with the accompanying drawings, in which.

Figure 1:
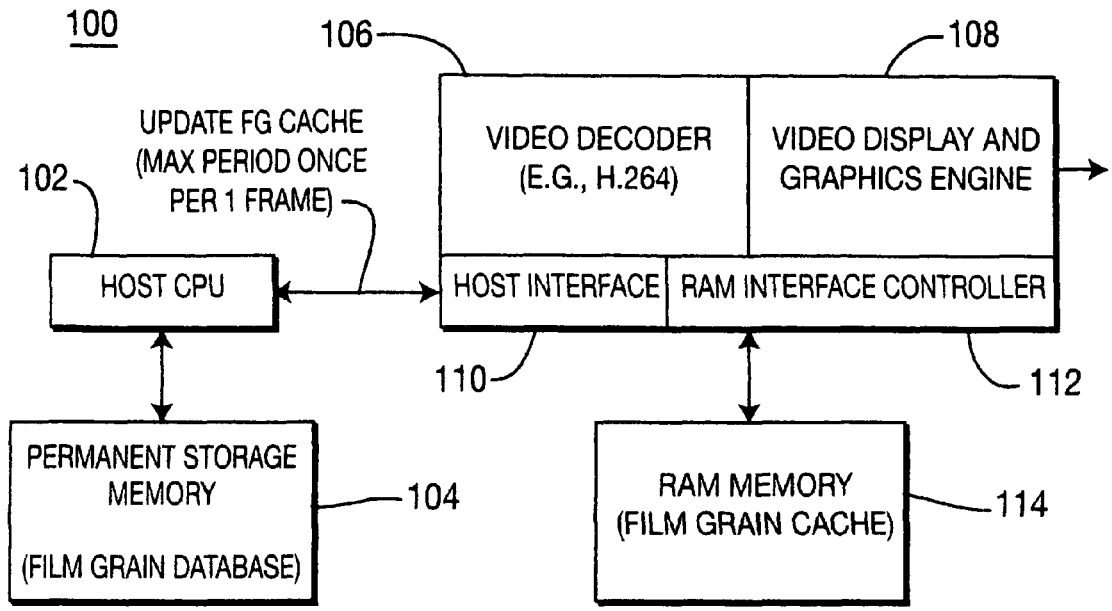
FIG. 1 depicts a high level block diagram of a video decoder subsystem having film grain simulation capabilities in accordance with one embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method for reading film grain patterns in a raster order in film grain simulation. Although the present invention will be described primarily within the context of a video decoder subsystem for application in, for example, IC designs for consumer HD DVD players, the specific embodiments of the present invention should not be treated as limiting the scope of the invention. It will be appreciated by those skilled in the art and informed by the teachings of the present invention that the concepts of the present invention can be advantageously applied in any film grain simulation processes in, for example, media player/receiver devices, decoders, set-top boxes, television sets or the like.

FIG. 1 depicts a high level block diagram of a video decoder subsystem having film grain simulation capabilities in accordance with one embodiment of the present invention. The video decoder subsystem 100 of FIG. 1 illustratively comprises a video decoder (illustratively a H.264 decoder) 106, a video display and graphics engine 108, a host interface 110, an interface controller (illustratively a RAM interface controller) 112, and a local memory (illustratively a local RAM memory) 114 implemented as a film grain cache for storing a small subset of the film grain patterns in the remote film grain database 104. FIG. 1 further depicts a host CPU 102 and a remote permanent storage program memory comprising a remote film grain database 104. Although in the video decoder subsystem 100 of FIG. 1, the host CPU 102 and the remote film grain database 104 are depicted as comprising separate components, in alternate embodiments of the present invention, the remote film grain database 104 can be located in a permanent memory of the CPU 102. Furthermore, although in the video decoder subsystem 100 of FIG. 1, the video decoder 106, the video display and graphics engine 108, the host interface 100, and the interface controller 112 are depicted as comprising separate components, in alternate embodiments of the present invention, the video decoder 106, the video display and graphics engine 108, the host interface 100, and the interface controller 112 can comprise a single component and can be integrated in a single integrated system-on-chip (SoC) design.

Furthermore, although in the video decoder subsystem 100 of FIG. 1, the means for storing the film grain patterns are depicted as a local memory 114 (cache) and a remote film grain database 104, in alternate embodiments of the present invention, substantially any accessible storage means may be implemented to maintain a subset of the film grain patterns and the total number of film grain patterns. Such means may include storage disks, magnetic storage media, optical storage media or substantially any storage means. In addition, one or more storage means may be implemented for each of the storage devices. Even further, although the film grain database 104 of FIG. 1 is depicted as being located remotely from the memory 114, in alternate embodiments of the present invention, the film grain patterns storage means may be located in close proximity or at great distances from each other.

Figure 2:
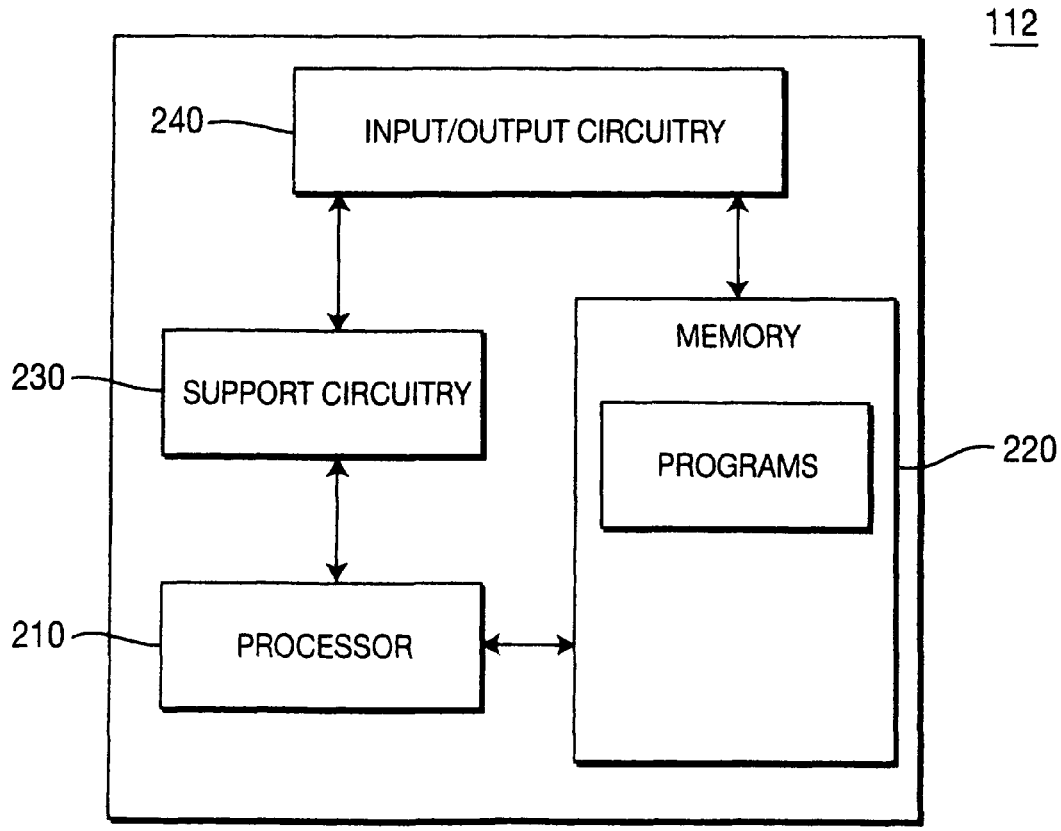
FIG. 2 depicts a high level block diagram of an embodiment of an interface controller suitable for use in the video decoder subsystem of FIG. 1.

FIG. 2 depicts a high level block diagram of an embodiment of an interface controller suitable for use in the video decoder subsystem 100 of FIG. 1. The interface controller 112 of FIG. 2 comprises a processor 210 as well as a memory 220 for storing control programs, algorithms and the like. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The interface controller 112 also contains input-output circuitry 240 that forms an interface between the various respective functional elements communicating with the interface controller 112.

Although the interface controller 112 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Referring back to the subsystem 100 of FIG. 1, the remote film grain database 104 is typically relatively large. In one embodiment of the present invention, the H.264 video decoder 106, the video display and graphics engine 108, the host interface 110, the interface controller 112, and the local memory 114 comprise components of an HD DVD player. Film grain patterns from the remote film grain database 104 are needed to be accessed at the sample rate of, for example, the HD DVD player. Therefore, fast access to the large film grain database 104 is necessary. In the subsystem 100 of FIG. 1 in accordance with the present invention, only a small portion of the remote film grain database 104 is used during Supplemental Enhancement Information (SEI) film grain periods, which are leveraged to develop a caching technique to reduce complexity.

More specifically, the film grain simulation process of FIG. 1 requires the decoding of film grain SEI messages, conveyed in the International Standard ITU-T Rec. H.264 I ISO/IEC 14496-10 bit-streams as specified by Amendment 1 (Fidelity Range Extensions), which are both herein included by reference in their entireties. In one embodiment of the present invention, film grain SEI messages are sent preceding I (intra-coded) pictures, and only one film grain SEI message precedes a particular I picture.

In one embodiment of the present invention, the remote film grain database 104 of film grain patterns is composed of 169 patterns of 4,096 film grain samples, each representing a 64×64 film grain image. In the film grain database 104, each film grain pattern is synthesized using a different pair of cut frequencies according to a frequency filtering model of the standard specifications. The cut frequencies transmitted in the SEI message are used to access the remote film grain database 104 of film grain patterns during the film grain simulation process. The film grain database 104 is stored in ROM, Flash, or other permanent storage device, such as the film grain database 104 of the video decoder subsystem 100 of FIG. 1, and typically does not change. The film grain database 104 contains random film grain patterns in a very large variety of film grain shapes and sizes. However, for a specific video content sequence only a small subset of this database is actually needed to effectively simulate film grain. The specification limits the number of film grain patterns to a small subset for any SEI message period. Therefore, the present invention implements a small film grain cache, such as the local memory 114, which is updated on receipt of SEI messages.

Typically, the remote film grain database 104 is stored in the permanent storage of the host CPU 102 or at the site of the host CPU 102. However, it is the video decoder 106 and the video display and graphics engine 108 that need fast access to the film grain database 104. As such, and in accordance with the present invention, the local memory 114 is provided for fast access to at least a subset of the film grain patterns. That is, at least a small subset of the film grain patterns needed or most implemented by the existing SEI message period is transferred to and stored in the local memory 114.

In one embodiment of the present invention, the local memory 114 is large enough to store the entire film grain database 104. In such an embodiment, the video decoder 106 and the video display and graphics engine 108 have immediate and fast access, via the interface controller 112, to all of the available film grain patterns originally stored in the remote film grain database 104. In addition, such an embodiment of the present invention has the advantage that the film grain cache in the local memory 114 does not have to be updated on receipt of an SEI message. Such an embodiment, however, has the disadvantage that more memory (e.g., RAM) is required. In some implementations, however, such large memory space is already available.

In an alternate embodiment of the present invention, the local memory 114 is only large enough to store a subset of the film grain database 104. In such an embodiment, on each receipt of an SEI message, the controller 112 initiates an examination of the cache of the local memory 114 to determine if any of the subset of film grain patterns already in the local memory 114 needs to be replaced with different film grain patterns in the remote film grain database 104 selected in the new SEI message. An advantage of this technique is a smaller local memory 114 allocation. A disadvantage is that the cache of the local memory 114 must be managed by the controller 112, and in the worst case, a full cache size must be transferred from the remote film grain database 104 to the local memory 114 for each I frame via, for example, the controller 112. In addition, in such an embodiment of the present invention, on device boot up (or reset), the local memory 114 (i.e., the film grain cache) can be pre-initialized by the controller 112 with the most common film grain patterns stored in the remote film grain database 104. That is, the selection of which film grain patterns to store in the local memory 114 depends on empirical data based on what film grain patterns in the film grain database 104 were most often used across a wide selection of film content.

In any event, in the above described embodiments of the present invention, the local memory 114 in accordance with the present invention, in conjunction with the controller 112, enable the video decoder 106 and the video display and graphics engine 108 faster access to the film grain patterns previously only contained in the remote film grain database 104.

As previously described and with respect to the video decoder subsystem 100 of FIG. 1, in one embodiment of the present invention, the film grain database 104 of film grain patterns is composed of 169, 64×64 sample images (patterns) of continuous film grain. Each of the 169 images represents a different film grain pattern. A film grain pattern has a specific size and shape created by a frequency filtering model as described in C. Gomila, J. Llach, J Cooper, "Film Grain Simulation for HD DVD Systems", Oct. 18 2004, which is herein incorporated by reference in its entirety.

Figure 3:
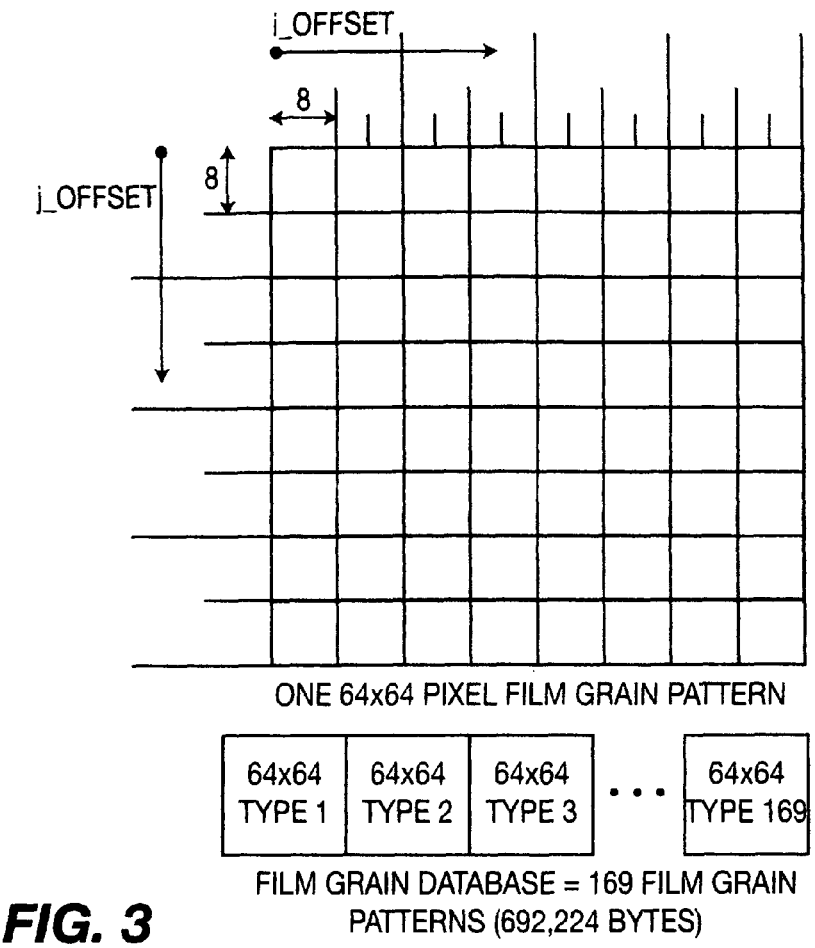
FIG. 3 depicts a high level block diagram of a typical arrangement of the film grain database of FIG. 1 and its offsets.

During a film grain simulation process, blocks of film grain are accessed in a random order. That is, a pseudo-random number generator is used to create an offset in the horizontal and vertical directions into a film grain pattern (or film grain pattern database having more than one film grain pattern) to determine a start read position for selecting samples of film grain patterns. For example, FIG. 3 depicts a high level block diagram of a typical arrangement of the film grain database of FIG. 1. FIG. 3 depicts a 64×64 sample film grain pattern having i_offset in the x-axis (horizontal offset) and j_offset in the y-axis (vertical offset). FIG. 3 further depicts the 169 film grain patterns of the various types. In one embodiment of the present invention and with reference to FIG. 3, the film grain pattern is composed of 64×64 samples divided into 8×8 blocks of film grain samples. In such embodiments of the present invention, the offsets may optionally be limited to the range [0, 48] to ensure that a full 16×16 block is available on the edges of the film grain pattern database. As described, a pseudo-random number generator is used to create an offset in the horizontal and vertical directions into the 64×64 film grain pattern. In one embodiment of the present invention, the horizontal offset resolution is limited to every $4^{th}$ sample, while the vertical offset resolution is limited to every $8^{th}$ sample. It should be noted however, that in alternate embodiments of the present invention, other horizontal offset and vertical offset resolution values may be chosen. Furthermore, in embodiments of the present invention, the offsets may optionally be limited to the range [0, 48] to ensure that a full 16×16 block is available on the edges of the film grain pattern database.

Figure 4:
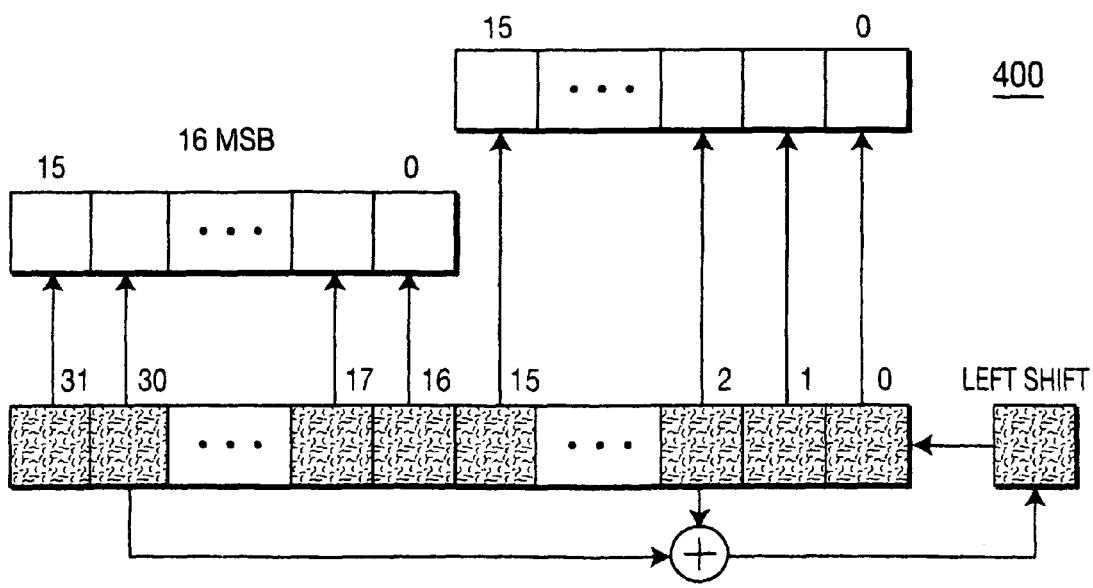
FIG. 4 depicts a high level block diagram of an embodiment of a uniform pseudo-random number generator for randomly selecting film grain blocks.

FIG. 4 depicts a high level block diagram of an embodiment of a pseudo-random number generator in accordance with the present invention. The pseudo-random number generator 400 of FIG. 4, using a polynomial modulo 2 operator, $x^{31}+x^3+1$, is used to randomly select film grain blocks of samples from the film grain patterns in a film grain database. In the embodiment of FIG. 4, the polynomial modulo 2 operator is implemented in a 32-bit shift register. At each stage, two random numbers are extracted from the register by taking the MSB and LSB. Specifically in the pseudo-random number generator 400 of FIG. 4, two random numbers are extracted from the register by taking the 16 MSB and 16 LSB, for an embodiment having film grain patterns of 64×64 samples in a film grain database grouped into 4 blocks of 8×8 samples, 2 vertical and 2 horizontal. In accordance with one embodiment of the present invention, upon receipt of a film grain SEI message, a seed, $e_1$, used for simulating film grain on the first color component is set to 1; a seed, $e_2$, used for simulating film grain on the second color component is set to 557,794, 999; and a seed, $e_3$, used for simulating film grain on the third color component is set to 974,440,221. It should be noted however that the values of seed $e_1$, $e_2$, and $e_3$ depicted above are merely one embodiment of the present invention and that in alternate embodiments of the present invention, other seed values may be used.

A subtle aspect of the pseudo-random number generator 400 of FIG. 4 is that blocks of film grain samples are grouped together in patterns. The patterns are achieved, in accordance with the present invention, by resetting the seed values for each group of blocks. That is, the seed values are the same for the beginning of each display line for every line of the group of blocks. This feature is implemented to maintain the larger film grain pattern quality.

For example, in one embodiment of the present invention, the film grain samples are grouped together in blocks of 8×8 samples and arranged in groups of 4 blocks, 2 horizontally and 2 vertically. This pattern is achieved, in accordance with the present invention, by resetting the seed values for each group of blocks only every 16 lines and 16 columns. That is, the seed values are the same for the beginning of each display line for every line of the group of blocks (i.e., for the example above, every 16 lines).

Although in the embodiment of the present invention described directly above, the inventors described the present invention implementing groups of 2×2 blocks of 8×8 samples (resulting in the updating of the seed values every 16 lines and 16 columns), other configurations can be used, even with a non-integer number of blocks, such that the seeds are updated after substantially any desired numbers of lines and columns consistently throughout the determined pattern. An important aspect of the present invention is to have a repeatable pseudo-random number pattern that is determinable.

In accordance with the present invention, the film grain patterns can be read out of memory in a raster order to match the display needs. This is possible, in accordance with the present invention, due to the repeatable characteristic of the pseudo random number generator as described above. To reiterate, the pseudo-random number x(k, ec) is started with a new seed upon receipt of a film grain SEI message. As such and referring to the example described above, a new random number in the pseudo random number sequence is generated every 16 horizontal samples across the display line. In accordance with the present invention, at the end of a display line, the pseudo-random number generator is reset with the value (x(k, ec)) from the beginning of the previous line. Since the pseudo-random process is repeatable, the same blocks are chosen every 16 samples during the second display line. This process repeats itself for each display line through the 16th display line. After the 16th display, the pseudo-random number x(k, ec) is updated to the next value in the sequence of pseudo-random values and saved (i.e., in a register) for use as the starting x(k, ec) for the next 16 display lines.

Figure 5:
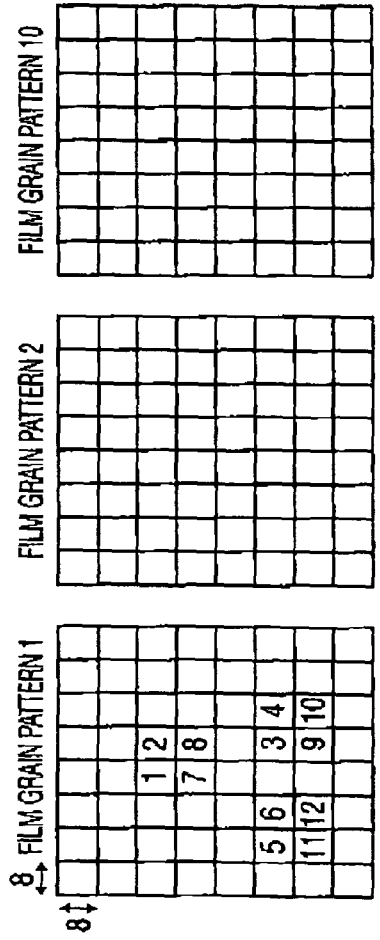
FIG. 5 depicts a high level block diagram of a plurality of 64×64 film grain patterns having 8×8 blocks where only one film grain pattern is used for the selection of film grain blocks.

For example, FIG. 5 depicts a high level block diagram of a plurality of 64×64 film grain patterns having 8×8 blocks where only one film grain pattern is used for the selection of film grain blocks. That is, in FIG. 5 all of the block averages of a decoded picture segment point to the same film grain pattern, film grain pattern 1 of FIG. 5. Therefore, FIG. 5 depicts the grouping of 8×8 blocks into 16×16 blocks in accordance with one embodiment of the present invention all in one film grain pattern.

Figure 6:
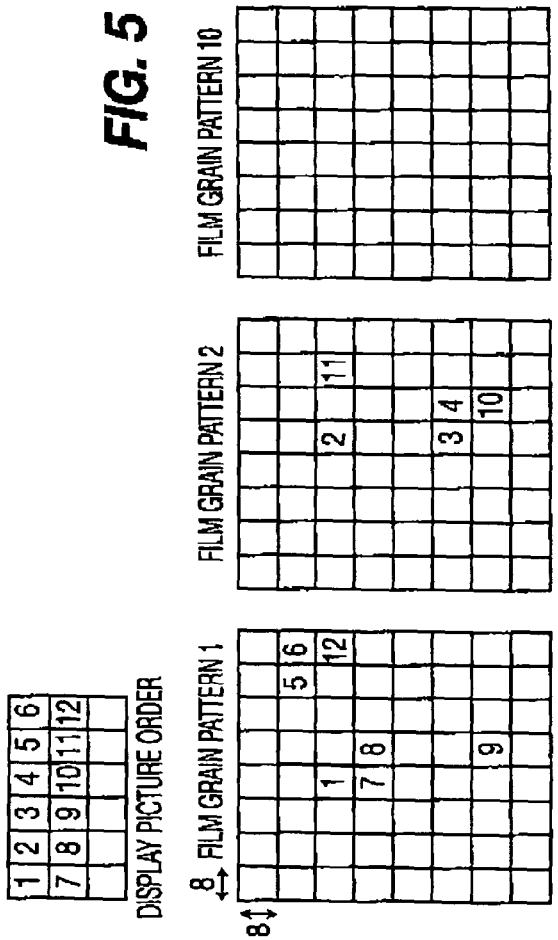
FIG. 6 depicts a high level block diagram of a plurality of 64×64 film grain patterns having 8×8 blocks where two film grain patterns are used for the selection of film grain blocks.

FIG. 6 depicts a high level block diagram of a plurality of 64×64 film grain patterns having 8×8 blocks where two film grain patterns are used for the selection of film grain blocks. That is, in the embodiment of FIG. 6 the block averages of a decoded picture segment point to film grain pattern 1 and pattern 2. In this case you can still see the 16×16 patterns, however they now cross back and forth between film grain pattern 1 and pattern 2. The same pseudo-random state is used for all the film grain pattern types.

Using the concepts of the present invention, the display engine of the decoder can read film grain data in raster order and full block (the illustratively 8×8 blocks) reads are not necessary. Another benefit of the above described concepts of the present invention is that an 8×8 block RAM used in film grain deblocking during film grain simulation for 8×8 blocks can be reduced to 2 samples. Only the two samples on the right edge of the previous film grain block on the current display line (e.g., previous_fg_block[i+6][j] and previous_fg_block[i+7][j]) are needed. That is, in deblocking vertical edges between adjacent blocks to form film grain patterns, a deblocking filter is applied between adjacent film grain blocks to ensure the seamless formation of film grain patterns. The deblocking filter applies only to the vertical edges between adjacent blocks. Because the film grain blocks are simulated in raster scan order in accordance with the present invention and as described above, only the two samples on the right edge of the previous film grain block on the current display line are needed for deblocking.

Having described various embodiments for a method and apparatus for reading film grain patterns in a raster order during film grain simulation (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method adapted for use in a video decoder, said method for reading film grain patterns in a raster order in film grain simulation, said method comprising:

establishing a start read offset position for selecting samples of the film grain patterns;

repeating said start read offset position for each display line of a group of film grain blocks from the film grain patterns by resetting at least one seed value for each group of film grain blocks such that the seed values are the same for the beginning of each display line of the group of film grain blocks; and using a different start read offset position for each display line of a next group of film grain blocks.

2. The method of claim 1, wherein said start read offset positions are determined pseudo-randomly.

3. The method of claim 1, wherein said start read offset positions are determined using a pseudo-random number generator.

4. The method of claim 1, wherein said start read offset positions each comprise a vertical offset and a horizontal offset.

5. The method of claim 4, wherein said horizontal offset is limited to every fourth film grain sample.

6. The method of claim 4, wherein said vertical offset is limited to every eighth film grain sample.

7. The method of claim 1, wherein said group of film grain blocks and said next group of film grain blocks each comprise four groups of 8×8 film grain samples, said groups being arranged as two vertical groups and two horizontal groups.

8. The method of claim 7, wherein said different start read offset position is triggered by resetting at least one seed value of a pseudo-random number generator implemented to determine said start read offset positions.

9. A method adapted for use in a video decoder, said method for reading film grain patterns in a raster order in film grain simulation, said method comprising:

establishing a pseudo-random starting position for selecting samples of the film grain patterns;

repeating said pseudo-random starting position for each line of a group of film grain blocks from the film grain patterns by resetting at least one seed value for each group of film grain blocks such that the seed values are the same for the beginning of each line of the group of film grain blocks; and using a different pseudo-random starting position for each display line of a next group of film grain blocks.

10. The method of claim 9, wherein said pseudo-random starting position is determined using a pseudo-random number generator.

11. The method of claim 9, wherein a number of film grain samples in each line of each group of film grain blocks is determined by setting seed values of said pseudo-random number generator.

12. The method of claim 9, wherein a number of lines in each group of film grain blocks is determined by said pseudo-random number generator.

13. The method of claim 9, wherein said pseudo-random starting positions each comprise a vertical offset and a horizontal offset of at least one film grain pattern.

14. The method of claim 13, wherein said horizontal offset is limited to every fourth film grain sample of said at least one film grain pattern.

15. The method of claim 13, wherein said vertical offset is limited to every eighth film grain sample of said at least one film grain pattern.

16. The method of claim 9, wherein said film grain patterns are located in a film grain database.

17. The method of claim 9, wherein said group of film grain blocks and said next group of film grain blocks each comprise four groups of 8×8 film grain samples, said groups each being arranged as two vertical groups and two horizontal groups.

18. An apparatus for enabling reading of film grain patterns in a raster order in film grain simulation comprising:

a pseudo random number generator, for establishing a pseudo-random starting position for selecting samples of the film grain patterns, for repeating said pseudo-random starting position for each line of a group of film grain blocks from the film grain patterns by resetting at least one seed value for each group of film grain blocks such that the seed values are the same for the beginning of each display line of the group of film grain blocks; and for establishing a different pseudo-random starting position for each display line of a next group of film grain blocks.

19. The apparatus of claim 18, wherein seed values for said pseudo-random number generator are the same for the beginning of each line of a group of film grain blocks.

20. The apparatus of claim 18, wherein seed values for said pseudo-random number generator are different between said group of film grain blocks and said next group of film grain blocks.

21. The apparatus of claim 18, wherein said pseudo-random number generator is implemented to randomly select groups of film grain blocks of from said film grain patterns.

22. The apparatus of claim 18, wherein said pseudo-random starting positions each comprise a horizontal offset and a vertical offset.

23. The apparatus of claim 22, wherein said offsets are limited to the range [0, 48].

24. The apparatus of claim 22 wherein said offsets are determined by the pseudo-random number generator by taking the most significant bit (MSB) and the least significant bit (LSB).

* * * * *